United States Patent
Kim et al.

(10) Patent No.: US 7,848,442 B2
(45) Date of Patent: Dec. 7, 2010

(54) SIGNAL PROCESSING APPARATUS AND METHOD IN MULTI-INPUT/MULTI-OUTPUT COMMUNICATIONS SYSTEMS

(75) Inventors: Bong-Hoe Kim, Gyeonggi-Do (KR); Dong-Youn Seo, Seoul (KR); Dong-Hee Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 969 days.

(21) Appl. No.: 11/097,009

(22) Filed: Mar. 31, 2005

(65) Prior Publication Data
US 2005/0220211 A1    Oct. 6, 2005

Related U.S. Application Data

(60) Provisional application No. 60/559,282, filed on Apr. 2, 2004.

(51) Int. Cl.
H04B 7/02 (2006.01)
(52) U.S. Cl. ............... 375/267; 375/260; 375/299; 375/347; 375/349
(58) Field of Classification Search ............... 375/367, 375/340, 347, 299, 267, 260, 349; 455/101; 370/342
See application file for complete search history.

(56) References Cited

U.S. PATENT DOCUMENTS

| | | | |
|---|---|---|---|
| 6,959,048 B1 * | 10/2005 | Horneman et al. | 375/299 |
| 2002/0159422 A1 * | 10/2002 | Li et al. | 370/342 |
| 2003/0021355 A1 * | 1/2003 | You | 375/267 |
| 2003/0043928 A1 * | 3/2003 | Ling et al. | 375/267 |
| 2003/0072382 A1 * | 4/2003 | Raleigh et al. | 375/267 |
| 2003/0103584 A1 | 6/2003 | Bjerke et al. | |
| 2004/0071223 A1 * | 4/2004 | Ko et al. | 375/267 |
| 2004/0185792 A1 * | 9/2004 | Alexiou et al. | 455/69 |
| 2004/0192218 A1 * | 9/2004 | Oprea | 455/73 |
| 2004/0223480 A1 * | 11/2004 | Nguyen et al. | 370/342 |
| 2005/0048933 A1 * | 3/2005 | Wu et al. | 455/101 |
| 2005/0052991 A1 * | 3/2005 | Kadous | 370/216 |
| 2005/0058217 A1 * | 3/2005 | Sandhu et al. | 375/267 |
| 2006/0193268 A1 * | 8/2006 | Walton et al. | 370/264 |
| 2007/0291870 A1 * | 12/2007 | Ponnekanti | 375/295 |

FOREIGN PATENT DOCUMENTS

| JP | 2003-198382 | 7/2003 |
|---|---|---|
| JP | 2003-304176 | 10/2003 |

* cited by examiner

*Primary Examiner*—Shuwang Liu
*Assistant Examiner*—Kabir A Timory
(74) *Attorney, Agent, or Firm*—Lee, Hong, Degerman, Kang & Waimey

(57) ABSTRACT

A signal processing apparatus in a multi-input/multi-output (MIMO) communication system includes a transmitting end in which a code rate is differently set and a respectively different modulation method is performed at each antenna in consideration of a channel situation of each transmission antenna, coded bits are separately interleaved, and then collectively interleaved to transmit data, and a receiving end in which received data is collectively deinterleaved and then decoded and deinterleaved separately according to each reception antenna, and a channel situation of each signal received from multiple transmission antennas is estimated and fed back to the transmitting end. A different coding rates and modulation method are used at each transmission antenna and the spatial interleaving is performed to obtain a diversity gain in a space domain, and thus, the communication quality can be enhanced.

4 Claims, 5 Drawing Sheets

SIGNAL PROCESSING APPARATUS AND METHOD IN MULTI-INPUT/MULTI-OUTPUT COMMUNICATIONS SYSTEMS

CROSS-REFERENCE TO RELATED APPLICATIONS

Pursuant to 35 U.S.C. §119(a), this application claims the benefit of earlier filing date and right of priority to U.S. Provisional Application No. 60/559,282, filed on Apr. 2, 2004; the contents of which is hereby incorporated by reference herein in its entirety.

BACKGROUND OF THE INVENTION

1. Field of the Invention

The present invention relates to a signal processing apparatus and method in a communication system called a multi-input/multi-output (MIMO) system in which transmitting and receiving ends commonly use multiple antennas 2. Description of the Related Art In the field of the related art, the MIMO mobile communication system is known to achieve more enhanced capability compared to a single antenna system, namely, a single antenna-to-single antenna or a multi-antenna-to-single antenna system.

However, to attain such improvement, an abundant scattering environment should be provided so that signals reaching to multiple reception antennas cannot be correlated. If the correlation among signals is neglected, performance would be degraded and capability would be reduced.

FIGS. 1 and 2 show a related art MIMO communication system employing a PARC (Per-Antenna Rate Control) method.

The PARC refers to a method based on the construction of a V-BLAST (Vertical Bell Laboratories Layered Space Time) system, one of conventional techniques of the MIMO system, in which symbols of signals are differently channel-coded and modulated according to each transmission antenna in a transmitting end with reference to channel information determined at a receiving end and then the corresponding signals are transmitted through each transmission antenna.

FIG. 1 is a view showing the construction of the transmitting end of the related art MIMO communication system employing the PARC method. The operation of the MIMO communication system employing the PARC method will now be described with reference to FIG. 1.

High speed data streams sequentially generated from the transmitting end is demultiplexed through a demultiplexer DEMUX 110 so as to be transmitted from each of multiple transmission antennas. Herein, the demultiplexing means dividing consistent data into a plurality of sub-data according to a determined regulation. FIG. 1 shows two antennas for the sake of explanation.

The demultiplexed sub-streams of each transmission antenna are coded and interleaved in signal processors 121 and 122, and then mapped to a symbol, respectively.

The mapped symbols are inputted to a spreader 131 in which a spreading code1 is multiplied thereto, coded into a scrambling code, and then transmitted to respective transmission antennas 161 and 162.

If a user occupies 10 channels discriminated by the spreading code, the divided sub-streams are divided again into 10 sub-streams, respectively. Respective divided data symbols are inputted into spreaders 131~133, in which each spreading code 1~10 is multiplied thereto, added in adders 141 and 142, coded into a scrambling code, and then, transmitted through respective transmission antennas 161 and 162. Herein, generally, one scrambling code is allocated per user. The number of bits allocated to the transmission antennas 161 and 162 can differ depending on a designated data rate.

The coding is made only in a temporal dimension, so its data restoration performance is not as high as that in the space-time coding which is used in a single-rate system. The coding in the temporal domain allows post-decoding interference cancellation, by which performance of a receiver is enhanced.

FIG. 2 is a view showing the construction of a receiving end of the related art MIMO communication system employing the PARC method. The operation of the receiving end of the MIMO communication system employing the PARC method will now be described with reference to FIG. 2.

After the data is demultiplexed and then coded into the scrambling code in the transmitting end, the signals of each transmission antenna can be independently decoded in the receiving end as shown in FIG. 2.

In other words, when the reception antennas 211 and 212 receive the symbol, symbols of each channel are estimated in a symbol detector according to a minimum mean square error (MMSE) method, despread and multiplexed by despreaders 241 and 242 and a multiplexer 250 so that a signal with respect to one antenna can be detected, and the detected signal is relocated (demapped), deinterleaved and then decoded in a signal processor 260.

Thereafter, a signal with respect to the antenna is reconfigured in a signal remover 270 based on the decoded bits and then the reconfigured signal is removed from a reception signal stored in a buffer.

Signals of other antennas are processed in the same manner and along the same path, and then coupled by a coupler 280.

The PARC is a MIMO system technique for a high speed downlink packet access (HSDPA) proposed by Lucent, which allows, unlike the V-BLAST, each transmission antenna to use a different data transmission rate to thereby increase a transmission capacity. In this case, the transmitting end transmits an encoded signal independent by transmission antennas.

The PARC system is different from the V-BLAST system, the existing single-rate MIMO technique in the aspect that each antenna has a different data transmission rate (modulation and coding).

Namely, the PARC system allows each antenna to control the data transmission rate independently more minutely, which leads to enhancement of a substantial transmission capacity of an overall system. In this case, although more bits are required for informing about a state of channels of each antenna than in techniques proposed for the single rate MIMO system, a reference set can be determined.

In other words, in the PARC system, in order to determine a MCS (modulation & Coding Scheme) set valid for each antenna, an SINR (Signal to Interference Noise Ratio) of each transmission antenna as received by each reception antenna is calculated.

At this time, in order to select a channel coding and modulation method to be used at each antenna, the SINR received through each antenna is measured, based on which a combination of a channel coding method and a modulation method to be used at each antenna is selected.

[Table 1] and [Table 2] show examples of combinations of transmission rate of transmitted data and an MCS in the MIMO system having four transmission antennas and four reception antennas.

TABLE 1

| bps/Hz | Data rate (Mbps) | Constellation | Coding rate |
|---|---|---|---|
| 3 | 7.2 | 16 QAM | ¾ |
| 2 | 4.8 | 16 QAM | ½ |
| 1.5 | 3.6 | QPSK | ¾ |
| 1 | 2.4 | QPSK | ½ |
| 0.5 | 1.2 | QPSK | ¼ |

TABLE 2

| Index | Rate: Mbps | Ant1 | Ant2 | Ant3 | Ant4 |
|---|---|---|---|---|---|
| 1 | 28.8 | 3 | 3 | 3 | 3 |
| 2 | 26.4 | 3 | 3 | 2 | 3 |
| 3 | 26.4 | 3 | 2 | 3 | 3 |
| 4 | 26.4 | 2 | 3 | 3 | 3 |
| 5 | 24.0 | 2 | 3 | 3 | 2 |
| 6 | 24.0 | 2 | 3 | 2 | 3 |
| 7 | 24.0 | 2 | 2 | 3 | 3 |
| 8 | 21.6 | 2 | 2 | 3 | 2 |
| 9 | 21.6 | 2 | 2 | 2 | 3 |
| 10 | 19.2 | 2 | 2 | 2 | 2 |
| 11 | 22.8 | 2 | 1.5 | 3 | 3 |
| 12 | 20.4 | 2 | 1.5 | 2 | 3 |
| 13 | 18.0 | 2 | 1.5 | 2 | 2 |
| 14 | 19.2 | 2 | 1.5 | 1.5 | 2 |
| 15 | 16.8 | 2 | 1 | 2 | 2 |
| 16 | 25.2 | 1.5 | 3 | 3 | 3 |
| 17 | 22.8 | 1.5 | 3 | 2 | 3 |
| 18 | 22.8 | 1.5 | 2 | 3 | 3 |
| 19 | 20.4 | 1.5 | 2 | 2 | 3 |
| 20 | 18.0 | 1.5 | 2 | 2 | 2 |
| 21 | 19.2 | 1.5 | 2 | 1.5 | 2 |
| 22 | 21.6 | 1.5 | 1.5 | 3 | 3 |
| 23 | 21.6 | 1.5 | 1.5 | 3 | 3 |
| 24 | 16.8 | 1.5 | 1.5 | 2 | 2 |
| 25 | 14.4 | 1.5 | 1.5 | 2 | 1 |
| 26 | 15.6 | 1.5 | 1.5 | 1.5 | 2 |
| 27 | 15.6 | 1.5 | 1 | 2 | 2 |
| 28 | 24.0 | 1 | 3 | 3 | 3 |
| 29 | 21.6 | 1 | 3 | 2 | 3 |
| 30 | 21.6 | 1 | 2 | 3 | 3 |
| 31 | 19.2 | 1 | 2 | 2 | 3 |
| 32 | 16.8 | 1 | 2 | 2 | 2 |
| 33 | 15.6 | 1 | 2 | 2 | 1.5 |
| 34 | 15.6 | 1 | 2 | 1.5 | 2 |
| 35 | 18.0 | 1 | 1.5 | 2 | 3 |
| 36 | 15.6 | 1 | 1.5 | 2 | 2 |
| 37 | 20.4 | 0.5 | 2 | 3 | 3 |
| 38 | 15.6 | 0.5 | 2 | 2 | 2 |
| 39 | 14.4 | 3 | | 3 | |
| 40 | 14.4 | | 3 | | 3 |
| 41 | 12.0 | 3 | | 2 | |
| 42 | 12.0 | | 3 | | 2 |
| 43 | 12.0 | 2 | | 3 | |
| 44 | 12.0 | | 2 | | 3 |
| 45 | 9.6 | 2 | | 2 | |
| 46 | 9.6 | | 2 | | 2 |
| 47 | 8.4 | 2 | | 1.5 | |
| 48 | 8.4 | | 2 | | 1.5 |
| 49 | 10.8 | 1.5 | | 3 | |
| 50 | 10.8 | | 1.5 | | 3 |
| 51 | 8.4 | 1.5 | | 2 | |
| 52 | 8.4 | | 1.5 | | 2 |
| 53 | 9.6 | 1 | | 3 | |
| 54 | 9.6 | | 1 | | 3 |
| 55 | 7.2 | 3 | | | |
| 56 | 7.2 | | | 3 | |
| 57 | 4.8 | 2 | | | |
| 58 | 4.8 | | | 2 | |
| 59 | 3.6 | 1.5 | | | |
| 60 | 3.6 | | | 1.5 | |
| 61 | 2.4 | 1 | | | |
| 62 | 2.4 | | | 1 | |
| 63 | 1.2 | 0.5 | | | |
| 64 | 1.2 | | | 0.5 | |

As shown in [Table 1], when the modulation method is performed at 16 QAM and a coding rate is 3/4, the data rate is the maximum, which corresponds the number of transmission bits per unit frequency of 3. And this case can be matched to a case where the SINR calculated at the reception antenna is the maximum.

The next fastest data rate is when the modulation method is performed at the 16 QAM and the coding rate is 1/2, which corresponds the number of transmission bits per unit frequency of 2. In this manner, each number of transmission bits per unit frequency is determined according to the modulation methods and the coding rates, and the number of transmission bits per unit frequency is allocated to the four transmission antennas of [Table 2].

[Table 2] shows examples of combinations of transmission rates in the system using four transmission antennas and four reception antennas. In [Table 2], the index '1' indicates that the number of transmission bits per unit frequency of each of the four transmission antennas is 3 and a data transmission rate is the highest, namely, 28.8.

In such a 4×4 PARC system (namely, the PARC system having four transmission antennas and four reception antennas), in case of the indices from 1 to 38 having a good channel situation because of the relatively shorter distance between the transmitting end and the receiving end, the four transmission antennas can be all used to transmit data, but in case of the indices from 39 to 54 having a bad channel situation because of a relatively longer distance between the transmitting end and the receiving end, two antennas with the larger number of transmission bits per unit frequency are selected from the four transmission antennas to transmit data therethrough.

However, in the afore-mentioned related art, the coding rating and modulation method is separately performed on each antenna in consideration of the channel situation of each antenna, and when the coding is performed, interleaving is also performed, but the interleaving in this context is merely performed in a time domain at each antenna. Thus, the related art fails to perform the interleaving in a space domain with respect to the entire signals to be transmitted through the multiple antennas, so it is disadvantageous in that a space diversity gain cannot be additionally obtained.

SUMMARY OF THE INVENTION

Therefore, an object of the present invention is to provide an apparatus and method for processing a signal in a multi-input/multi-output (MIMO) communication system capable of obtaining a diversity gain in a space domain and thus enhancing a communication quality by performing a spatial interleaving in the MIMO communication system employing a PARC (Per-Antenna Rate Control) method.

To achieve at least the above objects in whole or in parts, there is provided a signal receiving unit in an MIMO communication system, wherein data separately received through each reception antenna is decoded and deinterleaved differently according to each reception antenna, and then again deinterleaved collectively.

The signal receiving unit includes a unit for estimating each channel situation of signals received through multiple transmission antennas and feeding it back to a transmitting end.

The received data has been undergone an interleaving step separately performed by each transmission antenna and an interleaving step collectively performed on the entire multiple transmission antennas.

The signal receiving unit further includes a unit for estimating a channel through a pilot signal transmitted separately from each transmission antenna.

To achieve at least these advantages in whole or in parts, there is further provided a signal transmission method in a multi-input/multi-output (MIMO) communication system, including: coding and interleaving each demultiplexed data; entirely interleaving the coded and interleaved multiple data again; and modulating each data, spreading and scrambling the modulated data, and then transmitting it through multiple transmission antennas.

The data is coded at a different rate and modulated differently for each transmission antenna in consideration of a channel situation of each transmission antenna.

To achieve at least these advantages in whole or in parts, there is further provided a signal reception method in a multi-input/multi-output (MIMO) communication system, including: receiving data through multiple reception antennas, despreading and descrambling the despread descrambled data, and then demodulating and estimating the despread descrambled data; entirely deinterleaving each data; and separately decoding and deinterleaving each data.

The signal receiving method in the MIMO communication system further includes transmitting one index of a table, which includes each size of signal blocks transmittable at each transmission antenna, modulation methods and coding rates which has been determined and agreed with a transmitting end, as a feedback signal by using an SINR (Signal to Interference Noise Ratio) of the data estimated at each reception antenna.

To achieve at least these advantages in whole or in parts, there is further provided a signal processing method in a multi-input/multi-output (MIMO) communication system, including: interleaving coded bits to be transmitted through each transmission antenna; interleaving the coded bits entirely again; modulating the coded bits, spreading and scrambling the modulated data, and then transmitting the data through multiple transmission antenna; receiving the data through multiple reception antennas, despreading and descrambling the data and then demodulating and estimating the despread descrambled data; entirely deinterleaving the data received through each reception antenna; and decoding and deinterleaving the data for each reception antenna.

According to the present invention, a diversity gain over a space domain can be obtained by performing spatial interleaving in case of using a different coding rate and modulation method at each transmission antenna, and thus, a communication quality can be enhanced.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

A preferred embodiment of the present invention will now be described with reference to the accompanying drawings.

Figure 1:
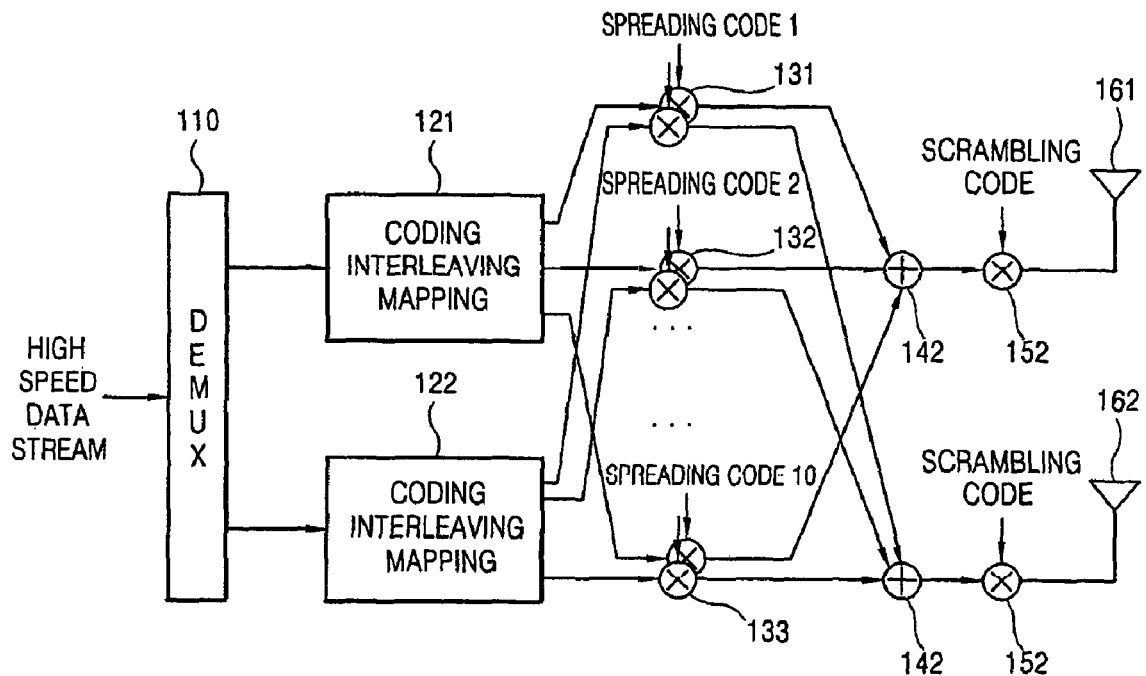
FIG. 1 is a view showing the construction of a transmitting end of a multi-input/multi-output (MIMO) communication system employing a PARC (Per-Antenna Rate Control) method in accordance with the conventional art.
Figure 2:
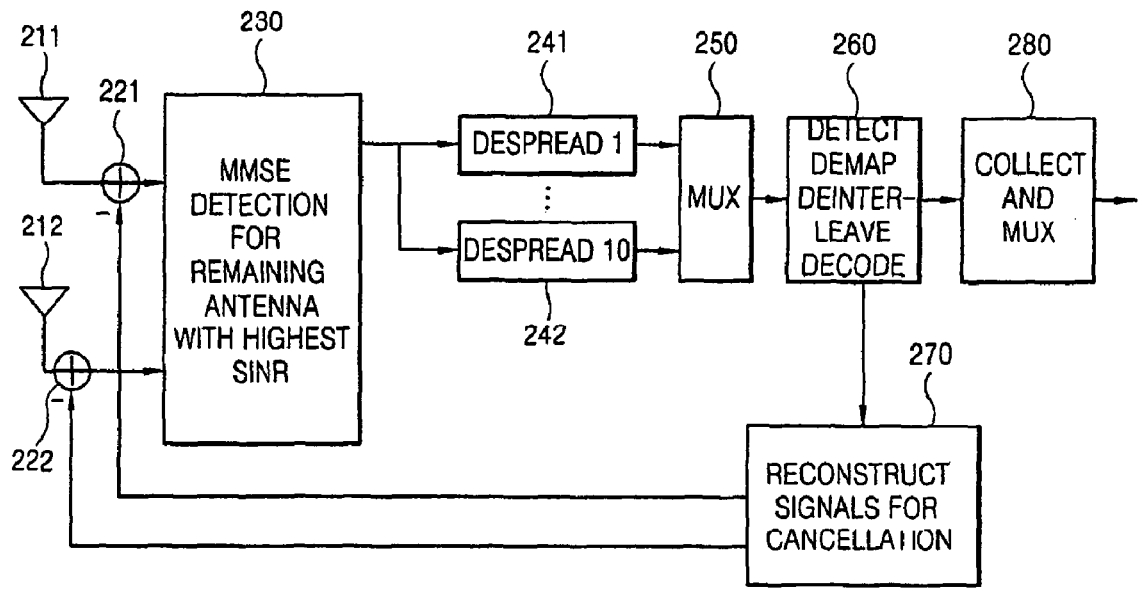
FIG. 2 is a view showing the construction of a receiving end of the MIMO communication system employing the PARC (Per-Antenna Rate Control) method in accordance with the conventional art.
Figure 3:
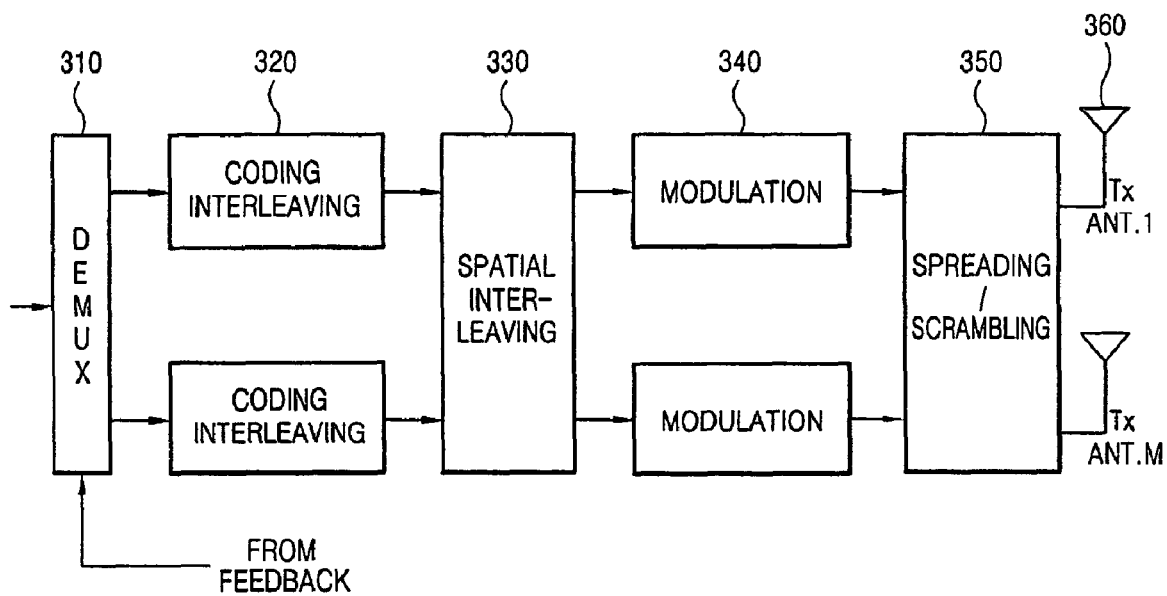
FIG. 3 is a block diagram showing the construction of a transmitting end of a MIMO communication system employing in accordance with a first embodiment of the prevent invention.
Figure 4:
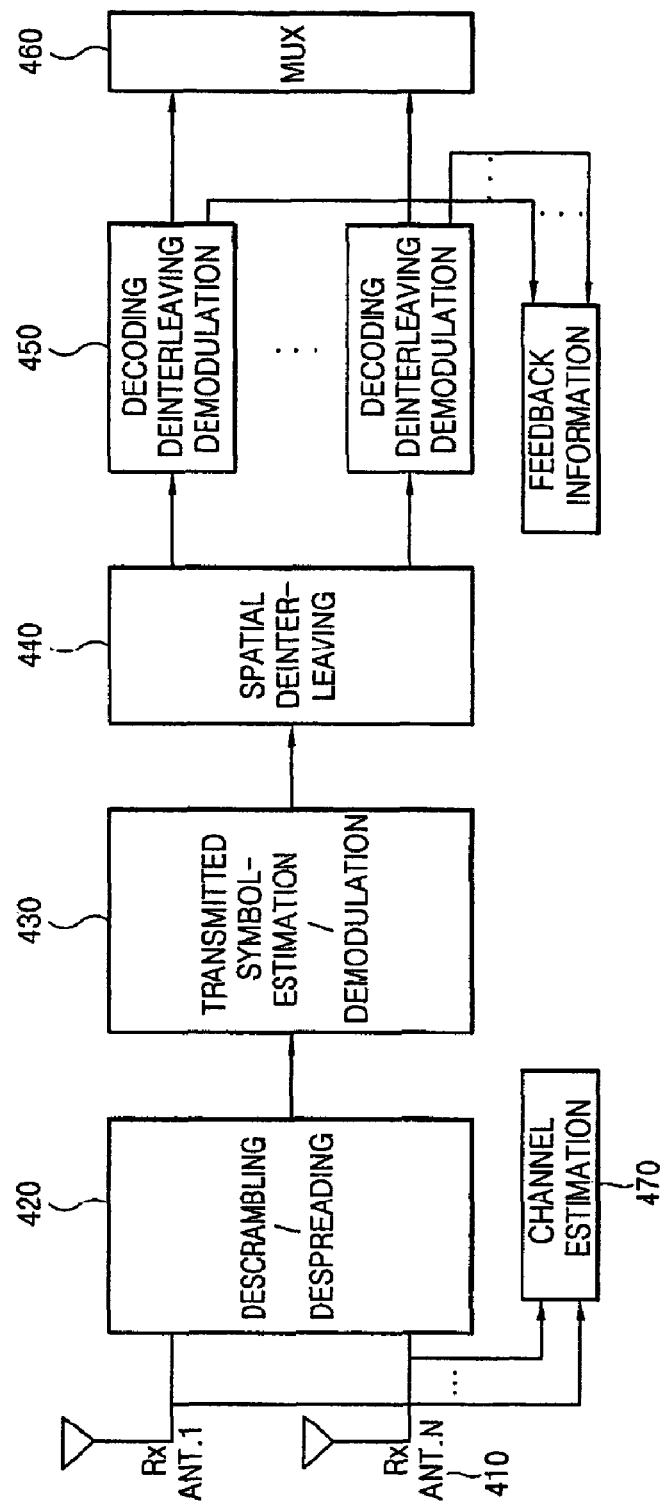
FIG. 4 is a block diagram showing the construction of a receiving end of a MIMO communication system employing in accordance with the first embodiment of the prevent invention.

FIG. 3 is a block diagram showing the construction of a transmitting end of a multi-input/multi-output (MIMO) communication system employing in accordance with a first embodiment of the prevent invention and FIG. 4 is a block diagram showing the construction of a receiving end of a MIMO communication system employing in accordance with the first embodiment of the prevent invention.

The construction and operation of the MIMO communication system employing a signal processing unit in accordance with a first embodiment of the present invention will now be described with reference to FIGS. 3 and 4.

The present invention assumes a closed-loop MIMO mobile communication system and an FDD system, and a receiving end feeds back a situation of a forward channel because a movement channel situation from a transmitting end to the receiving end cannot be known. However, in the TDD system, because the forward channel and a reverse channel are the same, although the receiving end does not feedback, the transmitting end can estimate the forward channel.

In the preferred embodiment of the present invention, it is assumed that a MIMO system has the M number of transmission antennas 310 and the N number of reception antennas 410 (in this case $N \geq M$).

With reference to FIG. 3, a transmitting end of the MIMO system includes a data generation unit (not shown) generating data to be transmitted, demultiplexer (DMUX) 310 for distributing the data to each antenna; an interleaving unit 320 interleaving each coded bit; a spatial interleaving unit 330 spatially interleaving the interleaved bits collectively; a modulation unit 340 modulating the interleaved data; a unit 350 spreading and scrambling the modulated data; and the M number of transmission antennas 360 transmitting modulated data, respectively.

The transmitting end performs coding on each data at a different coding rate and modulates it differently in consideration of a channel situation of each transmission antenna, performs interleaving on each coded bit, performs (spatial) interleaving on the interleaved bits collectively; and then transmits the data.

The channel situation of each transmission antenna is determined according to information fed back from the receiving end, and the feedback information can be a situation of a channel estimated by a pilot signal transmitted separately from each antenna or information including a calculated SINR of each transmission antenna as received by the reception antenna in order to determine an MCS valid for each transmission antenna. In this case, in order to select a channel coding method and a modulation method used for each transmission antenna, an SINR transmitted through each transmission antenna is measured and then combination of a channel coding method and a modulation method to be used for each transmission antenna is selected based on the measured SINR value.

In addition, in the transmitting end of the present invention, after the coded bits are interleaved for each transmission antenna, the interleaved bits are spatially interleaved again. Thus, because the interleaving is performed on the entire signals to be transmitted through the multiple antennas in the space domain, a spatial diversity gain can be additionally obtained.

The transmitting end operates as follows. First, high speed data streams sequentially generated from the data generating unit are demultiplexed through the demultiplexer (DEMUX) 310 so as to be respectively transmitted through the multiple transmission antennas. Herein, the demultiplexing refers to dividing consistent data into a plurality of sub-data according to a predetermined rule. The high speed data stream is a bit level of signal. At this time, it is assumed that information as to how much data is to be distributed to each transmission antenna is based on a feedback signal transmitted from the receiving end, as mentioned above. Or, the transmitting end can determined how much data is to be distributed to each transmission antenna upon receiving a feedback signal indicating a channel situation of each transmission.

Thereafter, the respective demultiplexed sub-streams for each transmission antenna are coded and interleaved by a signal processor, namely, by the interleaving unit 320 which interleaves codes bits transmitted by transmission antennas. Also, in this case, it is assumed that which coding rate is to be used at each transmission antenna is based on the feedback signal received from the receiving end. Or, the transmitting end itself can directly determine a coding rate to be used at each transmission antenna based on a feedback signal indicating a channel situation of each transmission antenna as received from the receiving end.

Herein, the interleaving is performed on each coded bit separately transmitted through each transmission antenna, which is performed only in a time domain of each transmission antenna.

In this respect, in the present invention, after the interleaving in the time domain, the coded bits are again interleaved spatially. Namely, the interleaving is additionally performed in a space domain, whereby a spatial diversity gain can be obtained.

Next, each data is mapped to a symbol through modulation, and the mapped symbols are inputted into the spreader, namely, the spreading/scrambling unit 350, and multiplied by a spreading code 1, which is then coded into scrambling codes, and then transmitted through each transmission antenna 360.

Also, in this case, it is assumed that which modulation method is to be used at each transmission antenna is based on a feedback signal received from the receiving end as stated above. Or, the transmitting end itself can determine a modulation method to be used at each transmission antenna based on a feedback signal indicating a channel situation of each transmission antenna as received from the receiving end.

The receiving end of the MIMO system in accordance with the first embodiment of the present invention will now be described with reference to FIG. 4.

As shown, the receiving end includes a plurality of reception antennas 410 receiving signals; a unit 420 for despreading and descrambling the received data; a unit for estimating and demodulating the despread descrambled data; a unit 440 for spatially deinterleaving the estimated demodulated data; a unit 450 for separately deinterleaving the collectively deinterleaved data; and a multiplexer 460 for adding the separately deinterleaved data. The receiving end can additionally include a unit 470 for estimating a channel through a pilot signal separately received from each transmission antenna of the transmitting end.

Since the transmitting end has the deinterleaving unit 330 for performing spatial interleaving on coded bits collectively, it is noted that the receiving end also includes the deinterleaving unit 440 for performing deinterleaving on the coded bits collectively.

The receiving end of the present invention operates as follows. When the data is demultiplexed and then coded into the scrambling code at the transmitting end, signals of each transmission antenna can be independently decoded through the multiple reception antennas of the receiving end. Namely, the data transmitted through each transmission antenna as shown in FIG. 3 is independently received through the plurality of reception antennas, despreaded and descrambled, and their symbols are estimated, and then demodulated.

Thereafter, the demodulated signals are spatially deinterleaved. This step corresponds to the interleaving step performed on the coded bits in the transmitting end. Through this additional interleaving step performed in the space domain, the spatial diversity gain can be obtained.

And then, the collectively deinterleaved data is decoded and deinterleaved. At this time, one index of a table which includes sizes of signal blocks transmissible at each transmission antenna, modulation methods, coding rates which have been predetermined and agreed based on an SINR of data estimated at each reception antenna with the transmitting end is transmitted as a feedback signal.

Subsequently, bits of symbols which have been transmitted from each transmission antenna are detected based on the decoded data, and then, bit streams which have been transmitted from the transmitting end is found through the multiplexer.

Figure 5:
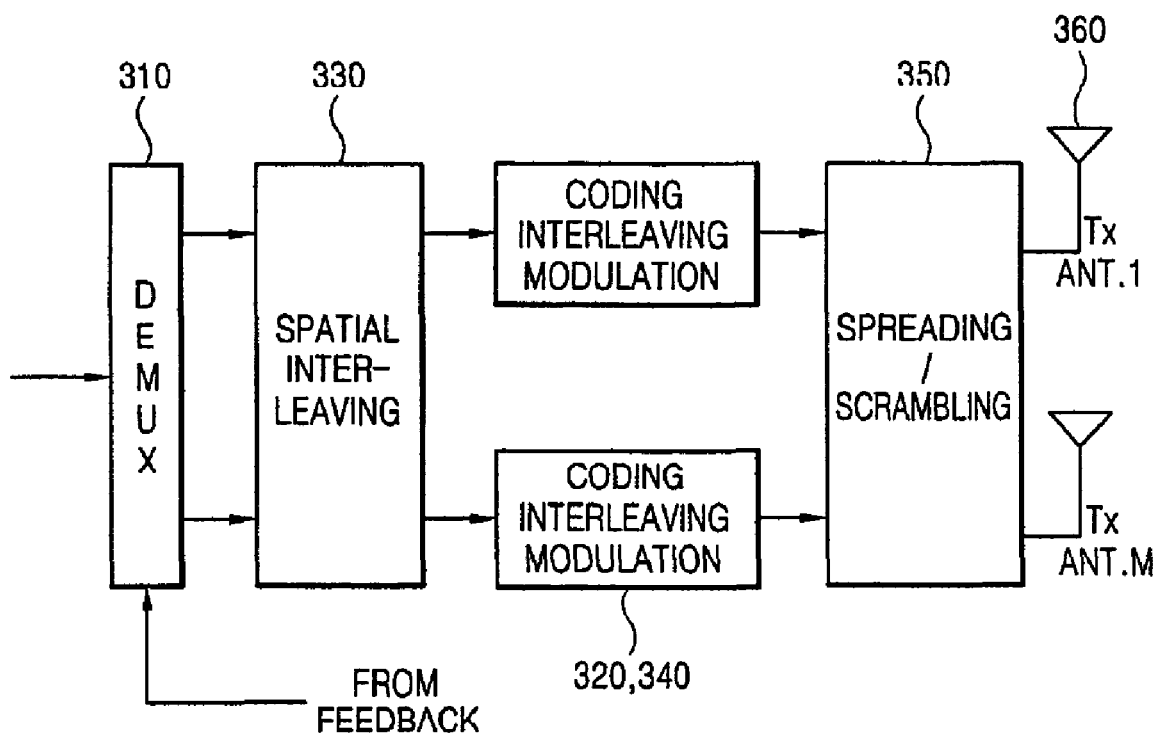
FIG. 5 is a block diagram showing the construction of a transmitting end of a MIMO communication system employing in accordance with a second embodiment of the prevent invention.
Figure 6:
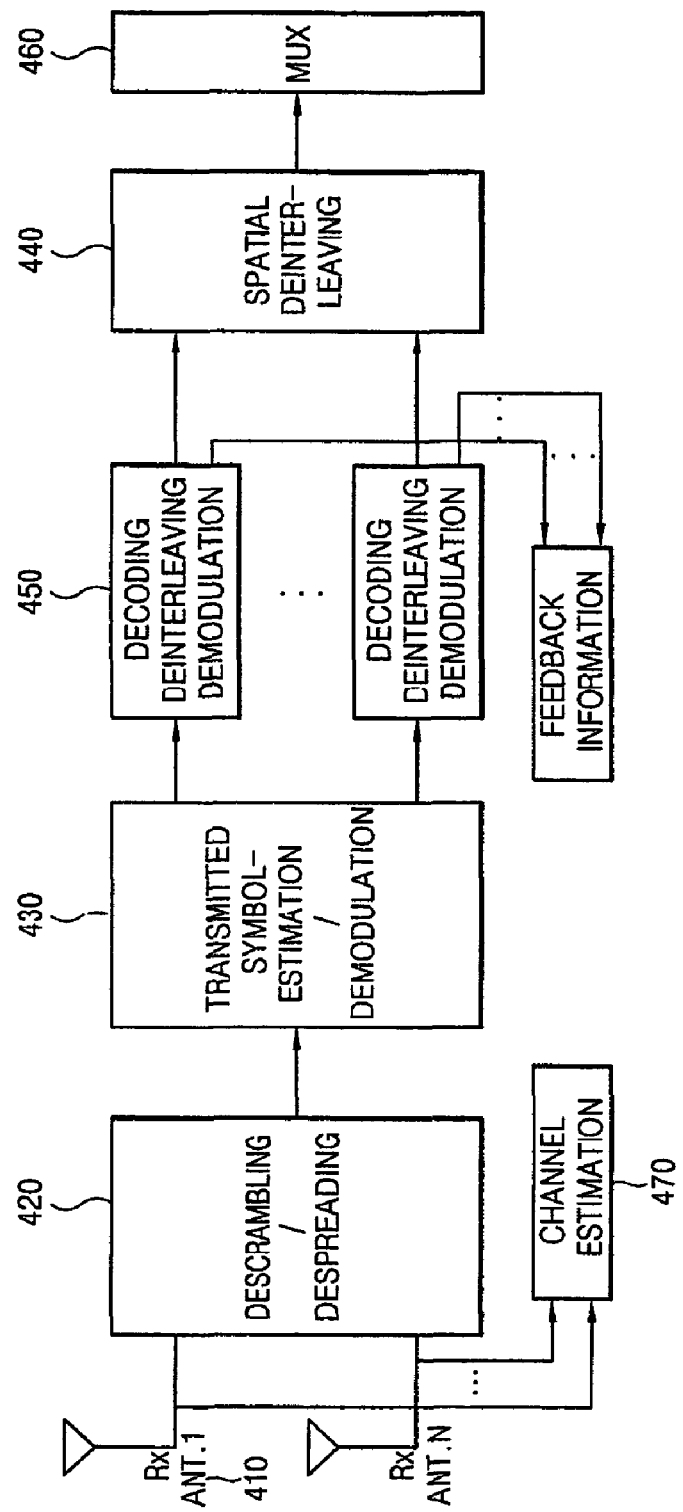
FIG. 6 is a block diagram showing the construction of a receiving end of a MIMO communication system employing in accordance with the second embodiment of the prevent invention.

FIG. 5 is a block diagram showing the construction of a transmitting end of a MIMO communication system employing in accordance with a second embodiment of the prevent invention, and FIG. 6 is a block diagram showing the construction of a receiving end of a MIMO communication system employing in accordance with the second embodiment of the prevent invention.

With reference to FIGS. 5 and 6, the transmitting and receiving ends of the second embodiment of the present invention are constructed with the same elements as those in the transmitting and receiving ends of the first embodiment of the present invention.

The only difference between the first and second embodiments of the present invention is that the unit 320 for interleaving coded bits and the unit 330 for spatially interleaving coded bits are interchanged in their positions in the transmitting end, and the unit 440 for spatially deinterleaving coded bits and the unit 450 for separately deinterleaving coded bits are interchanged in their positions in the receiving end.

Accordingly, likewise in the first embodiment of the present invention, in the second embodiment of the present invention, interleaving is also additionally is performed in the space domain to obtain the spatial diversity gain like the first embodiment, in this respect, however, the order of the interleaving step performed by each transmission antenna and the interleaving step performed by the entire transmission antennas is changed, and accordingly, the order of the deinterleaving step performed by each reception antenna and the deinterleaving step performed by the entire reception antennas is changed.

Namely, compared with the signal processing apparatus and method in accordance with the first embodiment of the present invention, the signal processing apparatus and method in the MIMO communication system in accordance with the second embodiment of the present invention is constructed such that the interleaving step in the time domain and the interleaving step in the space domain at the transmitting end are interchanged, and accordingly, the deinterleaving steps at the receiving end are interchanged. Other construction and operation are the same, so description of which is thus omitted.

As so far described, the apparatus and method for processing signals in a MIMO communication system have such an advantage that when a different coding rate and modulation method are used at each transmission antenna, the special interleaving is performed to obtain a diversity gain in the space domain, and thus, the communication quality can be enhanced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A signal transmission method in a multi-input/multi-output (MIMO) communication system, the method comprising:
    interleaving coded bits for each of a plurality of transmission antennas by a plurality of interleavers, wherein each coded bit for each of the plurality of transmission antennas is individually interleaved by one of the plurality of interleavers;
    performing an interleaving on the interleaved coded bits collectively through the plurality of transmission antennas, wherein each interleaved coded bit for each of the plurality of transmission antennas is spatially interleaved;
    modulating the collectively interleaved data for each of the plurality of transmission antennas;
    spreading and scrambling the modulated data for each of the plurality of transmission antennas; and
    transmitting the spread scrambled data through each of the plurality of transmission antennas,
    wherein the data is coded at a different rate and modulated differently for each of the plurality of transmission antennas in consideration of a channel situation of each of the plurality of transmission antennas,
    wherein the channel situation of each transmission antenna and a allocation of the coded bits to each of the plurality of interleavers is determined according to feedback information from a receiving end,
    wherein the feedback information is a situation of a channel estimated by a pilot signal transmitted separately from each antenna or information including a calculated SINR (Signal to Interference Noise Ratio) of each transmission antenna, and
    wherein an SINR transmitted through each transmission antenna is measured in order to select a channel coding method and a modulation method used for each transmission antenna.

2. A signal reception method in a multi-input/multi-output (MIMO) communication system, the method comprising:
    receiving data through a plurality of reception antennas;
    estimating a channel through a pilot signal separately received from each transmission antenna of a transmitting end;
    despreading and descrambling the received data for each of the plurality of reception antennas;
    demodulating and estimating the despread descrambled data for each of the plurality of reception antennas;
    deinterleaving the demodulated estimated data collectively through the plurality of reception antennas, wherein the demodulated and estimated data for each of the plurality of reception antennas is spatially deinterleaved;
    separately decoding and deinterleaving the collectively deinterleaved data by a plurality of deinterleavers, wherein the deinterleaved data for each of the plurality of reception antennas is individually deinterleaved by one of the plurality of deinterleavers; and
    transmitting feedback information by using an SINR (Signal to Interference Noise Ratio) of the data estimated at each of the plurality of reception antennas and a table comprising each size of signal blocks transmittable at each of the plurality of transmission antennas, modulation methods and coding rates that have been determined and approved with the transmitting end,
    wherein the data received through each of the plurality of reception antennas is interleaved by a plurality of interleavers at the transmitting end according to the feedback information, and
    wherein the feedback information allocates coded bits to each of the plurality of interleavers.

3. A signal transmission method in a multi-input/multi-output (MIMO) communication system, comprising:
    coding and interleaving demultiplexed data in a time domain for each of a plurality of transmission antennas by a plurality of interleavers, wherein the demultiplexed data for each of the plurality of transmission antennas is individually interleaved by one of the plurality of interleavers;
    collectively interleaving the coded and interleaved data in a space domain through the plurality of transmission antennas, wherein the interleaved data for each of the plurality of transmission antennas is spatially interleaved;

modulating the collectively interleaved data for each of the plurality of transmission antennas;

spreading and scrambling the modulated data for each of the plurality of transmission antennas; and transmitting the spread and scrambled data through each of the plurality of transmission antennas, wherein the data is coded at a different rate and modulated differently for each of the plurality of transmission antennas in consideration of a channel situation of each of the plurality of transmission antennas, wherein the channel situation of each transmission antenna and the allocation of the demultiplexed data to each of the plurality of interleavers is determined according to feedback information from a receiving end, wherein the feedback information is a situation of a channel estimated by a pilot signal transmitted separately from each antenna or information including a calculated SINR (Signal to Interference Noise Ratio) of each transmission antenna, and wherein an SINR transmitted through each transmission antenna is measured in order to select a channel coding method and a modulation method used for each transmission antenna.

4. A signal reception method in a multi-input/multi-output (MIMO) communication system, comprising:

receiving data through a plurality of reception antennas;

estimating a channel through a pilot signal separately received from each transmission antenna of a transmitting end;

despreading and descrambling the received data for each of the plurality of reception antennas;

demodulating and estimating the despread and descrambled data for each of the plurality of reception antennas;

deinterleaving the demodulated and estimated data in a space domain collectively through the plurality of reception antennas, wherein the demodulated and estimated data for each of the plurality of reception antennas is spatially deinterleaved;

separately decoding and deinterleaving the collectively deinterleaved data in a time domain by a plurality of deinterleavers, wherein the deinterleaved data for each of the plurality of reception antennas is individually deinterleaved by one of the plurality of deinterleavers; and transmitting feedback information by using an SINR (Signal to Interference Noise Ratio) of the data estimated at each of the plurality of reception antennas and a table comprising each size of signal blocks transmittable at each of the plurality of transmission antennas, modulation methods and coding rates that have been determined and approved with the transmitting end, wherein the data received through each of the plurality of reception antennas is interleaved by a plurality of interleavers at the transmitting end according to the feedback information, and wherein the feedback information allocates coded bits to each of the plurality of interleavers.

* * * * *